(12) United States Patent
Serruys et al.

(10) Patent No.: US 7,863,544 B2
(45) Date of Patent: Jan. 4, 2011

(54) ARRANGEMENT AND METHOD FOR THE ON-LINE MONITORING OF THE QUALITY OF A LASER PROCESS EXERTED ON A WORKPIECE

(75) Inventors: Wim Serruys, Gullegem (BE); Johan De Keuster, Heverlee (Ekeren) (BE); Joost Duflou, Leuven (BE); Jean-Pierre Kruth, Heverlee (BE)

(73) Assignee: LVD Company NV, Gullegem (BE)

( * ) Notice: Subject to any disclaimer, the term of this patent is extended or adjusted under 35 U.S.C. 154(b) by 519 days.

(21) Appl. No.: 11/890,774

(22) Filed: Aug. 7, 2007

(65) Prior Publication Data
US 2009/0050612 A1 Feb. 26, 2009

(30) Foreign Application Priority Data
Aug. 7, 2006 (EP) .................................. 06118552

(51) Int. Cl.
*B23K 26/03* (2006.01)
(52) U.S. Cl. .................................................. 219/121.83
(58) Field of Classification Search ............ 219/121.64, 219/121.85, 121.83, 121.63, 121.65, 121.66, 219/121.78
See application file for complete search history.

(56) References Cited

U.S. PATENT DOCUMENTS

| | | | | |
|---|---|---|---|---|
| 3,700,791 | A * | 10/1972 | Bosomworth | 358/485 |
| 5,155,329 | A * | 10/1992 | Terada et al. | 219/121.83 |
| 5,199,431 | A | 4/1993 | Kittrell et al. | |
| 5,463,202 | A * | 10/1995 | Kurosawa et al. | 219/121.83 |
| 6,670,574 | B1 * | 12/2003 | Bates et al. | 219/121.64 |
| 6,757,055 | B1 | 6/2004 | Kluft | |

(Continued)

FOREIGN PATENT DOCUMENTS

DE 87 10866 7/1987

(Continued)

OTHER PUBLICATIONS

Camera for Laser Beam Profiling from 1.0 to 2.0 microns Wavelength with an Indium Gallium Arsenide based Focal Plane Array [online], accessed via the Internet [retrieved on Aug. 1, 2010] URL: <http://spiedl.org/terms.*

Primary Examiner—Joseph M Pelham
Assistant Examiner—Thien Tran
(74) Attorney, Agent, or Firm—James Creighton Wray; Meera P. Narasimhan

(57) ABSTRACT

The invention relates to an arrangement (1) for the on-line monitoring of the quality of a laser process exerted on a workpiece (3), comprising
a laser source transmitting a laser beam (4) to the workpiece (3), the thermal process of the laser beam (4) causing emission of electromagnetical radiation (7) from the process zone on the workpiece (3);
a heat detection camera (8) for detecting the electromagnetical radiation emitted from the process zone of the workpiece (3),
wherein the arrangement (1) is provided with a tilted non-focussing mirror (5) such that the laser beam (4) which is transmitted by the laser source is let through the tilted non-focussing mirror (5) towards the working piece (3), and the electromagnetical radiation (7) emitted from the process zone on the workpiece (3) is reflected by the tilted non-focussing mirror (5) towards the heat detection camera (8). The invention further relates to a method using such an arrangement (1).

15 Claims, 1 Drawing Sheet

U.S. PATENT DOCUMENTS

| | | |
|---|---|---|
| 6,791,057 B1 | 9/2004 | Kratzsch et al. |
| 2002/0036190 A1 | 3/2002 | Tamura et al. |
| 2005/0252895 A1* | 11/2005 | Schuermann et al. .. 219/121.83 |
| 2007/0056940 A1* | 3/2007 | Salem et al. ........... 219/121.83 |

FOREIGN PATENT DOCUMENTS

| | | |
|---|---|---|
| DE | 19852302 | 5/2000 |
| DE | 10 2004 020 704 | 11/2005 |
| EP | 0577589 | 5/1994 |
| EP | 1099506 | 5/2001 |
| WO | WO 03/022508 | 3/2003 |

* cited by examiner

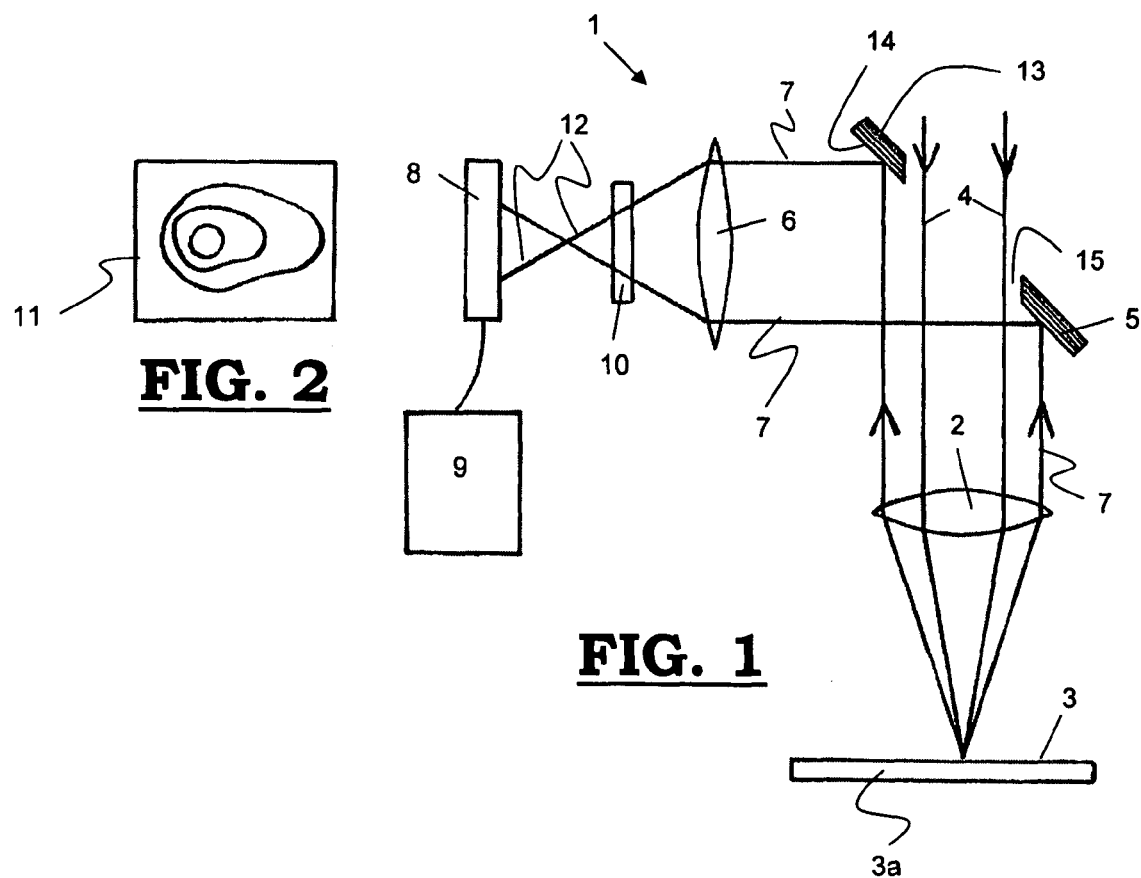

ARRANGEMENT AND METHOD FOR THE ON-LINE MONITORING OF THE QUALITY OF A LASER PROCESS EXERTED ON A WORKPIECE

This application claims the benefit of European Application No. 06 118 552.6 filed Aug. 7, 2006, which is hereby incorporated by reference in its entirety.

The invention relates to an arrangement for the on-line monitoring of the quality of a laser process exerted on a workpiece, comprising
- a laser source transmitting a laser beam to the workpiece, the thermal process of the laser beam causing emission of electromagnetical radiation from the process zone on the workpiece; and
- a heat detection camera for detecting the electromagnetical radiation emitted from the process zone on the workpiece, wherein the arrangement is provided with a tilted mirror such that the laser beam which is transmitted by the laser source is let through the tilted mirror towards the working piece, and the electromagnetical radiation emitted from the process zone on the workpiece is reflected by the tilted mirror towards the heat detection camera.

The invention also relates to a method for the on-line monitoring of the quality of a laser process exerted on a workpiece, wherein
- a laser beam is transmitted from a laser source to the workpiece, the thermal process of the laser beam causing emission of electromagnetical radiation from the process zone on the workpiece;
- the electromagnetical radiation emitted from the process zone on the workpiece is detected with a heat detection camera, wherein the laser beam emitted from the laser source is transmitted towards the working piece through a tilted mirror, and the electromagnetical radiation emitted from the process zone on the workpiece is reflected by the tilted mirror towards the heat detection camera.

Although laser cutting, and also laser welding, are nowadays well-established sheet metal processing methods, still a lot of fundamental research is ongoing, which concentrates among others on the cutting of thick plates with a thickness of at least 15 mm. A significant trend that could be observed in recent years is the increase of laser power, driven by the demand to increase the thickness of plates that can be processed. This evolution proves to be not as obvious as it was initially thought. The process windows in which good cut quality can be obtained are more narrow for thick plates than for thin sheets, because a critical balance needs to be respected between the different process parameters like laser power, cutting velocity, gas pressure, focal distance, etc. Limited deviations from the optimal process conditions can already result in a significant deterioration of the cut quality or even loss of cut. Therefore, cutting of thick plates is still far from being an autonomous manufacturing process: human supervision of the process remains necessary and, even then, scrap percentages may be high.

Therefore, it is important to develop an accurate on-line monitoring control system to monitor the quality of a laser process exerted on a workpiece.

According to the state of the art, the following classes for the monitoring of a laser process already exist:

The monitoring of the intensity of the radiation emitted by the process at the same side of the workpiece as the side onto which the laser beam is acting. Examples of such patent applications are EP 1 238 749, U.S. Pat. No. 5,045,669, EP 1 275 465 and DE 101 20 251.

In EP 1 238 749, a method is described involving directing a cutting beam at a workpiece that penetrates the workpiece under control dependent on a detected parameter reproducing the state of penetration of the workpiece. At least two potential control parameters are continuously detected before penetration through the workpiece, at least one potential control signal is produced per parameter and assessed against usability criteria. Independent claims are also included for the following: an arrangement for flame cutting of workpieces.

In U.S. Pat. No. 5,045,669, a laser materials processing apparatus is described including means for optically and acoustically monitoring the processing and generating a processing signal representative of the processing, means for interpreting the processing signal and generating an interpreted output, and means for controlling the materials processing based upon the interpreted output and by generating a control signal applied to a laser materials processing component.

In EP 1 275 465, a system is described for the control of the quality of a laser cut or perforation, comprising means to focus a laser beam onto a cut or perforation zone, photodiode sensor means to detect the radiation emitted by the cut or perforation zone, and a control and processing electronic unit to process the signals emitted by said sensor means an optical filter is provided that is associated with said photodiode sensor means to select an optical band around 620 nm. The signal coming from said sensor means is acquired with a frequency comprised between 10 and 60 kHz and filtered with a bandpass filter between 7 and 16 kHz. In this way the control of the quality of the cut or perforation can be carried out on the basis of the sole signal thus processed, without the need of a comparison with the predetermined reference signal corresponding to a good quality cut or perforation.

In DE 101 20 251, the invention concerns a method which can be carried out with a sensor device, for monitoring a laser machining operation to be performed on a workpiece, in which for quality assurance with a local-resolution receiver assembly a given field of observation is selected in the region of the interaction zone between laser beam and workpiece, in which radiation coming from the selected field of observation is detected with a radiation-sensitive receiver which delivers an electrical signal corresponding to the detected radiation, in which the electrical signal is filtered in a signal processing circuit in order to detect rapid and/or short, fault-related changes in intensity of the detected radiation, and in which the filtered electrical signal for the detection of faults during the laser machining operation.

The disadvantage of these systems is that only one signal of a predetermined zone of the laser process can be monitored at the same time. It is not possible to observe the whole laser process.

The monitoring of the wavelength of the radiation emitted by the process. An example thereof can be found in DE 101 60 623, wherein a method is disclosed wherein an optical radiation from a region of interaction between the working laser beam and workpiece is measured, and the beam spectral distribution is determined. From the determination of the beam spectral distribution, inspection and control magnitudes are derived for the process.

A disadvantage of this system is that the signal is the integral of all process radiation from the different positions in the laser process. Hence a lot of useful information gets lost.

The monitoring of an image of the process at the side of the workpiece opposite to the side onto which the laser beam is acting.

In JP 2001138082, a method and a device for controlling laser beam cutting is described by which cutting condition is monitored and detected by a monitor during machining and simultaneously machining conditions can be automatically changed to those capable of obtaining improved cutting. To this end, the control method is provided in such a way that a monitor detects the colour and jetting angle of the light of spatters SP generating in a machining zone in laser beam cutting, a comparison is made between the machining condition data of the detected cutting state and the data of the improved cutting state, and that the cutting conditions can be automatically changed so that the colour and the jetting angle of the spattering light always exhibit those of the improved cutting. A numerically-controlled (NC) laser beam machining device is provided with a cutting condition monitoring device which detects the colour of the spatter and plasma generating at a machining zone and detects the state of the machining zone, and a comparing means which compares, with judgment, the machining condition data of the cutting state detected by the monitor and those of the improved cutting registered in the storage unit of the NC device, so that the cutting conditions are automatically changed so that each detected state constantly becomes the improved cutting state.

Also in the article "A knowledge-Based Adaptive Control Environment for an Industrial Laser Cutting System", Huang M Y, Chatwin C R (1994), Opt. Laser Eng. Vol. 21, p. 273-295, by means of a CCD-camera and a photodiode-based system, a spark cone at the bottom of the plate was observed. The interpretation of the recorded images (cone density, etc.) provided the necessary input for a knowledge-based adaptive control system for laser cutting.

The serious disadvantage of these methods however is the placement of the monitor underneath the workpiece, i.e. the environment is very aggressive (spatter of molten material, etc.). Furthermore, in the article, an extra positioning system for synchronous movement with the cutting head is required.

The monitoring of an image of the process at the same side of the workpiece as the side onto which the laser beam is working.

In WO 0029166 (corresponding with DE 198 52 302), a method is described for machining workpieces, using high-energy radiation, especially a laser beam, whereby said beam is focused onto a machining point by means of a machining lens system, the luminous radiation from the workpiece is picked up by the machining lens system and evaluated using a detector that is part of a process monitoring device. In a machining area of said workpiece, an optical measurement is carried out on the surface of the workpiece with an external light source, using the measured light that is reflected from the machining area. The method is characterized in that the beam of light used to monitor the process and the reflecting measured light are detected using the same machining lens system.

In EP 1 099 506, a process parameter measuring method is described that uses measurement of the light intensity coaxial to the laser radiation within the machining zone, adjacent a capillary formed by the laser beam, using an optical sensor, coupled to an evaluation device. The image sensor has a dynamic range of above 70 dB, for supplying the evaluation device with image signals for the capillary region and the enclosing smelt zone simultaneously.

The disadvantage of the method as shown in FIG. 1 of WO 0029166 and as described in EP 1 099 506 is that these methods only are suitable for laserwelding and not for lasercutting, since no focussing lens is provided between the process zone of the workpiece and the lasersource through which no cutting pressure can be build up.

The disadvantage of the method as shown in FIG. 2 of WO 0029166 is that this is only realisable with a Nd-Yag laser and not with a $CO_2$-laser, as is mentioned in the patent application itself, and the disadvantage of the method as shown in FIG. 3 of WO 0029166 is that the dichroic mirror will suffer from thermal deformation because of the through laser beam, negatively influencing the cutting process.

In DE 10 2004 020 704, the invention relates to a sensor device for detecting radiation from the region of a zone of interaction between a laser beam and a workpiece for monitoring a laser machining operation and a workpiece, in particular a laser welding operation, and a device for monitoring the laser machining operation, in particular the laser welding operation, and a laser machining head having such a sensor device. The sensor device possesses a radiation-sensitive receiver arrangement and an imaging device which images a region to be observed in the region of a zone of interaction onto the receiver arrangement. In order to achieve a compact and space-saving structure it is provided that the imaging device comprises a focusing mirror arranged in the working beam pathway of the laser beam which diverts radiation from the region to be observed out of the working beam pathway and focuses it onto the receiver arrangement.

A major disadvantage of this method is that the image will be unsharp. The laser process radiation that passes through the focussing lens will suffer from chromatic aberration. The focussing lens has a different focal point for each wavelength. When no special measures are taken, such as a bandpass filter or special lenses, the images in the different wavelengths (and focus) will add on each other and create an unsharp view of the laser process. A second disadvantage of this method is that a parabolic mirror is expensive and complex to align into the optic axis.

The on-line monitoring for the control of the cutting quality of a laser process by means of the monitoring of a thermal image, wherein for each point in the image a temperature is measured. Such a system is disclosed in the article "Thermographic system for process monitoring of laser beam cutting", Haferkamp H, von Alvensleben F, von Busse A, Goede M, Thurk O, Proc SheMet '00, p. 261-270. Therein, the thermal image is monitored by means of a CCD-camera for the control of Nd:YAG laser cutting of sheet metals measuring the temperature field emitted from the processing zone.

A disadvantage of this system is that the described configuration only works for a Nd-Yag laser source with relatively low (2 kW) power. The configuration also assumes that the wavelength of the lasersource is almost the same as the wavelength of the process radiation, i.e. both around 1 μm. Therefore, also a camera in this wavelength range such as CCD or CMOS is used. Also the application is restricted to thin sheets (0.5-1 mm) that are cutted with $N_2$. The technique does not apply for cutting with other gases such as $O_2$.

It is an object of the invention to provide an arrangement and a method for the on-line monitoring of the quality of a laser process exerted on a workpiece, not showing the above-mentioned disadvantages. It is a further object of the invention to provide an arrangement and a method for the on-line monitoring of the quality of a laser process exerted on a workpiece, wherein in an accurate way, the quality of the laser process, also for the laser processing of thick plates, can be monitored and the laser process can be adjusted in function of the in-process measured quality.

These objects of the invention are solved by providing an arrangement for the on-line monitoring of the quality of a laser process exerted on a workpiece, comprising
- a laser source transmitting a laser beam to the workpiece, the thermal process of the laser beam causing emission of electromagnetical radiation from the process zone on the workpiece;
- a heat detection camera for detecting the electromagnetical radiation emitted from the process zone on the workpiece, wherein the arrangement is provided with a tilted mirror such that the laser beam which is transmitted by the laser source is let through the tilted mirror towards the working piece, and the electromagnetical radiation emitted from the process zone on the workpiece is reflected by the tilted mirror towards the heat detection camera, and wherein
- the tilted mirror is a non-focussing mirror provided with an opening through which the laser beam transmitted from the laser source can propagate unhindered;
- between the mirror and the heat detection camera, an objective lens is provided for focussing the electromagnetical radiation emitted from the process zone on the workpiece and reflected by the mirror;
- between the objective lens and the heat detection camera a smallband filter is provided for filtering the focussed electromagnetical radiation to electromagnetical radiation with one wavelength situated in the infrared zone of the electromagnetical spectrum with a wave length between 1.1 and 2.5 .mu.m; and
- said heat detection camera is a short wavelength infrared camera sensitive for radiation ranging from 0.9-2.5 .mu.m provided for detecting said filtered electromagnetical radiation having said one wavelength.

The smallband filter (with a band width of ±30 nm) is provided to avoid chromatic aberration. The use of an infrared camera over a CCD or CMOS camera is that it is optimal for observing melting metal. Because the melting temperature of mild steel is typically around 1800 K, the peak wavelength of the emitted radiation is typically around 1.6 µm according to Planck's law. Therefore, this sensor is most suitable for observing the process front and the direct neighbourhood.

In a first advantageous arrangement according to the invention, the mirror is a substantially completely reflecting mirror provided with an opening through which the laser beam transmitted from the laser source can propagate unhindered.

In a second advantageous arrangement according to the invention, the mirror is a dichroic mirror provided with an anti-reflective top surface coating and having a reflective bottom surface coating and provided with an opening, the opening being provided in order to limit the thermal heating of this optical component.

In a preferred arrangement according to the invention, the laser source is a $CO_2$-laser source, because of the fact that $CO_2$-lasers are the most used industrial laser sources for the higher power (>3 kW)

Preferably, the dichroic mirror as mentioned above is made from ZnSe, because of the fact that it is able to let through $CO_2$-laser radiation.

In a preferred embodiment of an arrangement according to the invention, the mirror is tilted under an angle of 35°.

This has the advantage that the diameter of the mirror can be kept smaller.

The smallband filter preferably is provided for filtering the electromagnetical radiation emitted from the process zone on the workpiece to electromagnetical radiation with a wavelength of approximately 1.5 .mu.m.

The objects of the invention are further solved by providing a method for the on-line monitoring of the quality of a laser process exerted on a workpiece, wherein
- a laser beam is transmitted from a laser source to the workpiece, the thermal process of the laser beam causing emission of electromagnetical radiation from the process zone on the workpiece,
- the electromagnetical radiation emitted from the process zone on the workpiece is detected with a heat detection camera, wherein the laser beam emitted from the laser source is transmitted towards the working piece through a tilted non-focussing mirror, and the electromagnetical radiation emitted from the process zone on the workpiece is reflected by the tilted mirror towards the heat detection camera, and wherein the laser beam emitted from the laser source is transmitted towards the working piece through a tilted mirror which is a non-focussing mirror provided with an opening through which the laser beam transmitted from the laser source can propagate unhindered, and the electromagnetical radiation that is emitted from the process zone on the workpiece and that is reflected by the mirror is focussed by the heat detection camera, whereafter the focussed electromagnetical radiation is filtered by means of a smallband filter that is provided between the objective lens and the heat detection camera to electromagnetical radiation with one wavelength between 1.1 and 2.5 .mu.m, wherein said heat detection camera is a short wavelength infrared camera sensitive for radiation ranging from 0.9-2.5 .mu.m provided for detecting said filtered electromagnetical radiation having said one wavelength.

The laser process can be a laser cutting as well as a laser welding process.

In a preferred method according to the invention, an arrangement according to the invention as described above is used.

In the following detailed description, the characteristics and advantages of an arrangement and a method for the on-line monitoring of the quality of a laser process exerted on a workpiece according to the invention, which have been mentioned before, will be further clarified. The intention of this description is only to further explain the general principles of the present invention, therefore nothing in this description may be interpreted as being a restriction of the field of application of the present invention or of the patent rights demanded for in the claims.

BRIEF DESCRIPTION OF THE DRAWINGS

In this description, by means of reference numbers, reference will be made to the attached FIGS. 1 and 2, wherein:

FIG. 1 shows a schematic view of a preferred embodiment of an arrangement according to the invention;

FIG. 2 shows a top view of the measured thermal graphical image of the laser process.

DETAILED DESCRIPTION OF THE PREFERRED EMBODIMENTS

An arrangement (1) for the on-line monitoring of the quality of a laser process exerted on a workpiece (3) as shown in FIG. 1, comprises a $CO_2$-laser source (not shown in the figure) transmitting a laser beam (4) to the workpiece through a lens (2), the thermal process of the laser beam causing emission of electromagetical radiation from the process zone on the workpiece (7). The arrangement (1) further comprises a tilted non-focussing mirror (5), which is tilted under an angle of 35°, and which is provided for letting through the laser beam (4) transmitted from the laser source and for reflecting the electromagnetical radiation (7) emitted from the process zone on the workpiece (3).

The mirror (5) can be a substantially completely reflecting mirror provided with an opening (15) through which the laser beam (4) transmitted from the laser source can propagate unhindered. However, the mirror (5) can also be a dichroic mirror provided with an anti-reflective top surface coating (13) and having a reflective bottom surface coating (14). This dichroic mirror (5) is provided with an opening (15), in order to limit the thermal heating of this optical component. The dichroic mirror is preferably made from ZnSe. However, also another material can be used that is able to let through $CO_2$-laserlight with low absorption.

The electromagnetical radiation (7) as reflected by the tilted mirror (5) passes through a smallband filter (10) towards a heat detection camera (8). The smallband filter (10) is provided for filtering the electromagnetical radiation (7) emitted from the process zone on the workpiece (3) to electromagnetical radiation (12) with one wavelength situated in the infrared zone of the electromagnetical spectrum with a wavelength between 1.1 and 2.5 .mu.m. Preferably, the wavelength of the filtered electromagnetical radiation (12) is approximately 1.5 .mu.m. The heat detection camera (8) best suitable for detecting the filtered electromagnetical radiation (12) is therefore an infrared camera, for instance a short wavelength camera sensitive for radiation ranging from 0.9-2.5 .mu.m. More specific, the XEVA-FPA-320 camera from XenICs is selected. This camera is based on InGaAs (abbreviation for Indium Gallium Arsenide) technology and therefore sensitive in the near-infrared spectrum, ranging from 0.9 to 1.7 .mu.m. The heat detection camera (8) is thus of the photosensitive matrix type with x rows of y pixels, indicating for each pixel value which intensity of the radiation of this pixel is achieved. These values are then further read out and processed in a computing unit (9).

Between the mirror (5) and the heat detection camera (8), an objective lens (6) is provided for focussing the electromagnetical radiation (7) emitted from the process zone on the workpiece (3) and reflected by the mirror (5) towards the heat detection camera (8). This objective lens (6) can be placed between the mirror (5) and the smallband filter (10), but can also be placed between the smallband filter (10) and the heat detection camera (8).

In the method according to the invention for the on-line monitoring of the quality of a laser process exerted on a workpiece (3), as performed by an arrangement (1) as shown in FIG. 1, a laser beam (4) is transmitted from a laser source (not shown on the figure) through a lens (2) to the workpiece (3), the thermal process of the laser beam (4) causing emission of electromagnetical radiation from the process zone on the workpiece (3), whereafter this electromagnetical radiation emitted form the process zone on the workpiece (3) is reflected by means of the tilted mirror (5) towards the heat detection camera (8) passing through an objective lens (6) and a smallband filter (10). As already stated above, the values from the heat detection camera (8) are then further read out and processed in the computing unit (9).

The laser process can be laser cutting as well as laser welding, and can also be used for processing plates (3a) made of sheet metals such as steel, aluminium, titanium, etc. with different assist gasses such as $N_2$ or $O_2$.

As can be seen in FIG. 2, the image of the laser process (11) that is observed by the photosensitive matrix is a collection of concentrical closed lines, which in fact represent the isotherms of the laser process. The form and the dimensions of these isotherms (11) make it possible to measure the in-process parameters. Examples of such quality parameters are drag of striations, dross attachment, occurrence of burning defects, cut width and the squareness of the edge, (loss of) full penetration, roughness of the cut edge, etc. These parameters are on their turn used in order to optimise the initial parameters of the laser process such as speed, laser power and gas pressure.

The invention claimed is:

1. Apparatus (1) for the on-line monitoring of the quality of a laser process exerted on a workpiece (3), comprising a laser source transmitting a laser beam (4) to the workpiece (3), the thermal process of the laser beam (4) causing emission of electromagnetic radiation (7) from the process zone on the workpiece (3);

a heat detection camera (8) for detecting the electromagnetic radiation (7) emitted from the process zone of the workpiece (3), wherein the arrangement (1) is provided with a tilted mirror (5) such that the laser beam (4) which is transmitted by the laser source is let through the tilted mirror (5) towards the working piece (3), and the electromagnetic radiation (7) emitted from the process zone on the workpiece (3) is reflected by the tilted mirror (5) towards the heat detection camera (8), wherein the tilted mirror (5) is a non-focusing mirror provided with an opening through which the laser beam (4) transmitted from the laser source can propagate unhindered;

between the mirror (5) and the heat detection camera (8), an objective lens (6) is provided for focussing the electromagnetic radiation (7) emitted from the process zone on the workpiece (3) and reflected by the mirror (5);

between the objective lens (6) and the heat detection camera a smallband filter (10) is provided for filtering the focused electromagnetic radiation (7) to electromagnetic radiation with one wavelength situated in the infrared zone of the electromagnetic spectrum with a single wavelength between 1.1 and 2.5 µm, and said heat detection camera (10) is a short wavelength infrared camera sensitive for radiation ranging from 0.9-2.5 µm provided for detecting said filtered electromagnetic radiation (12) having said single wavelength.

2. Apparatus according to claim 1, wherein the mirror is a substantially completely reflecting mirror provided with an opening through which the laser beam (4) transmitted from the laser source can propagate unhindered.

3. Apparatus according to claim 1, wherein the mirror is a dichroic mirror (5) provided with an anti-reflective top surface coating and having a reflective bottom surface coating and provided with an opening (15).

4. Apparatus according to claim 1, wherein the laser source is a $CO_2$-laser.

5. Apparatus according to claim 3, wherein the dichroic mirror (5) is made from ZnSe.

6. Apparatus according to claim 1, wherein the mirror (5) is tilted under an angle of 35°.

7. Apparatus according to claim 1, wherein the smallband filter (10) is provided for filtering the electromagnetic radiation (7) emitted from the process zone on the workpiece to electromagnetic radiation (12) with the single wavelength being approximately 1.5 µm.

8. Method comprising on-line monitoring of quality of a laser process exerted on a workpiece (3), wherein
a laser beam (4) is transmitted from a laser source to the workpiece (3), the thermal process of the laser beam (4) causing emission of electromagnetic radiation (7) from the process zone on the workpiece (3),
the electromagnetic radiation (7) emitted from the process zone on the workpiece (3) is detected with a heat detection camera (8),
wherein the laser beam (4) emitted from the laser source is transmitted towards the working piece (3) through a tilted mirror (5), and the electromagnetic radiation (7) emitted from the process zone on the workpiece (3) is reflected by the tilted mirror (5) towards the heat detection camera (8), wherein the laser beam (4) emitted from the laser source is transmitted towards the working piece (3) through a tilted non-focussing mirror provided with an opening through which the laser beam (4) transmitted from the laser source can propagate unhindered, and the electromagnetic radiation (7) that is emitted from the process zone on the workpiece (3) and that is reflected by the mirror (5) is focused by means of an objective lens (6) which is provided between the mirror (5) and the heat detection camera (8), whereafter the focused electromagnetic radiation (7) is filtered by a smallband filter (10) that is provided between the objective lens (6) and the heat detection camera (8) to electromagnetic radiation with one wavelength situated in the infrared zone of the electromagnetic spectrum with a single wavelength between 1.1 and 2.5 µm, wherein said heat detection camera (10) is a short wavelength infrared camera sensitive for radiation ranging from 0.9-2.5 µm provided for detecting said filtered electromagnetic radiation (12) having said single wavelength.

9. Method according to claim 8, wherein the laser process is a laser cutting or laser welding process.

10. Method according to claim 8, wherein the laser beam (4) transmitted from the laser source propagates unhindered through an opening in the mirror which is a substantially completely reflecting mirror.

11. Method according to claim 8, wherein the laser beam (4) transmitted from the laser source propagates unhindered through an opening in the mirror which is a dichroic mirror (5) provided with an anti-reflective top surface coating and having a reflective bottom surface coating and provided with an opening (15).

12. Method according to claim 8, wherein the laser is a $CO_2$-laser.

13. Method according to claim 11, wherein the dichroic mirror (5) is made from ZnSe.

14. Method according to claim 8, wherein the mirror (5) is tilted under an angle of 35°.

15. Method according to claim 8, wherein the smallband filter (10) filters the electromagnetic radiation (7) emitted from the process zone on the workpiece to electromagnetic radiation (12) with the single wavelength being approximately 1.5 µm.

\* \* \* \* \*